(12) United States Patent
Mackie (10) Patent No.: US 8,145,184 B2
(45) Date of Patent: Mar. 27, 2012

(54) PROTECTED DATA CAPTURE

(75) Inventor: Robert Mackie, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 883 days.

(21) Appl. No.: 11/831,918

(22) Filed: Jul. 31, 2007

(65) Prior Publication Data
US 2009/0036157 A1 Feb. 5, 2009

(51) Int. Cl.
*H04M 11/04* (2006.01)
*H04B 1/38* (2006.01)
*H04W 24/00* (2009.01)

(52) U.S. Cl. .................. 455/404.2; 455/90.1; 455/456.1

(58) Field of Classification Search ............... 455/456.1, 455/90.1, 404.1, 404.2
See application file for complete search history.

(56) References Cited

U.S. PATENT DOCUMENTS

| | | | |
|---|---|---|---|
| 7,424,282 B2 * | 9/2008 | Barbeau ..................... | 455/404.1 |
| 2002/0137528 A1 * | 9/2002 | Fraccaroli .................... | 455/457 |
| 2002/0168961 A1 * | 11/2002 | Ohba ............................ | 455/410 |
| 2004/0014456 A1 * | 1/2004 | Vnnen .......................... | 455/413 |
| 2004/0203842 A1 * | 10/2004 | Hanninen et al. .......... | 455/456.1 |
| 2004/0214568 A1 * | 10/2004 | Anderson ................... | 455/426.1 |
| 2005/0101334 A1 * | 5/2005 | Brown et al. ............... | 455/456.3 |
| 2005/0159132 A1 * | 7/2005 | Wright et al. .............. | 455/404.1 |
| 2005/0191988 A1 * | 9/2005 | Thornton et al. .......... | 455/404.1 |
| 2006/0176149 A1 * | 8/2006 | Douglas ....................... | 340/5.74 |
| 2007/0014442 A1 * | 1/2007 | Yu .................................. | 382/124 |
| 2007/0015490 A1 * | 1/2007 | Munje et al. ................ | 455/410 |
| 2007/0042747 A1 * | 2/2007 | Sun ............................... | 455/403 |
| 2007/0072581 A1 * | 3/2007 | Aerrabotu ................... | 455/404.1 |
| 2008/0039052 A1 * | 2/2008 | Knowles .................... | 455/412.1 |
| 2008/0088428 A1 * | 4/2008 | Pitre et al. .................... | 340/506 |
| 2008/0132199 A1 * | 6/2008 | Hirata ........................ | 455/404.2 |
| 2008/0178251 A1 * | 7/2008 | Shin .............................. | 725/141 |
| 2008/0227429 A1 * | 9/2008 | Hodgson et al. ........... | 455/404.2 |

OTHER PUBLICATIONS

Request for Comments 3344, Network Working Group, Aug. 2002.
Request for Comments 4721, Network Working Group, Jan. 2007.
Brin, David, Earth, Jan. 1, 1990, pp. 101-103, Publisher: Bantam Books, Published in: London, UK.
Mutual, W. An Dblome, J., ComVU Mobile, demo2005fall/55006. php, Sep. 1, 2005, Volume www.demo.com/, Number demonstrators/, Publisher: VideoEgg, Published in: San Francisco, CA, US and Internet.
Slashdot, "Students Put UCLA Taser Video on You Tube", Nov. 21, 2006, http://news.slashdot.org/article.pl? sid=06/11/21/0438238, 1 page.

* cited by examiner

*Primary Examiner* — Christopher M Brandt
(74) *Attorney, Agent, or Firm* — Stolowitz Ford Cowger LLP

(57) ABSTRACT

In one embodiment, a method includes receiving disposition data from a subscriber. The disposition data indicates a first particular condition predicate for performing a particular action on data associated with the subscriber and archived by a service provider. After receiving the disposition data, first data associated with the subscriber is received by the service provider in near-real time. If it is determined that the particular condition is not satisfied, then the service provider performs a different second particular action.

20 Claims, 5 Drawing Sheets

FIG. 5

PROTECTED DATA CAPTURE

BACKGROUND OF THE INVENTION

1. Field of the Invention

The present invention relates to recording events in the vicinity of a human operator that protects the recording so as to enhance safety for the human operator.

2. Description of the Related Art

In a world of security threats and strangers, it can be challenging to document situations without running grave personal risk. While recording equipment (audio recording devices, cameras or video recording devices in some combination) is often available, the recorded information is subject to destruction by the very person whose action is being recorded, such as a criminal caught while committing a crime, or an official exceeding or abusing the official's authority. Often the human operator of the recording equipment is also subject to violence or other harm by the very person whose action is being recorded.

For example, suppose that a witness sees an unauthorized person park in a handicapped space, asks that unauthorized person to move, and is refused by that unauthorized person. The witness then takes a picture of the unauthorized user's license plate, with the handicapped markings in view, using a cell phone owned by the witness.

What if the witness had seen a serious crime, such as a mugging or a case of police brutality or a bribe by a high ranking official? Would the witness have been brave enough to take a picture knowing that a nearly immediate response by the criminal would likely be to attack the witness and take or destroy the cell phone?

There is a need for a way to collect the information without subjecting the operator or the information to harm.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Techniques are described for protected data capture. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

1.0 Overview

In one set of embodiments, a method includes receiving disposition data from a subscriber. The disposition data indicates a particular condition predicate for performing a particular action on data associated with the subscriber and archived by a service provider. After receiving the disposition data, first data associated with the subscriber is received by the service provider in near-real time. If it is determined that the particular condition is not satisfied, then the service provider performs a different second particular action.

In another set of embodiments, a method includes receiving, on a portable apparatus, first data to be recorded. Second data is also received on the portable apparatus. The second data indicates that the first data is to be recorded securely for a particular person. In response to receiving the second data, the first data is transmitted to a remote site. The remote site is configured to store the first data until the particular person indicates that the particular person is not under duress and indicates the first data is to be deleted.

In other sets of embodiments, an apparatus, software on a computer-readable medium, or logic encoded in a tangible medium performs one or more steps of the above methods.

2.0 Strucural Overview

Networks of communications devices and general-purpose computer systems connected by external communication links are well known and widely used in commerce. The networks often include one or more intermediate network nodes that facilitate the passage of information between end nodes, such as telephones, general purpose computing devices, and special purpose devices, such as hand held communication devices, which originate or receive the information. A network node is an intermediate network node or end node connected by the communication links. Data is communicated among network nodes based on one or more well-known, new or still developing protocols. In this context, a protocol consists of a set of rules defining how the nodes interact with each other based on information sent over the communication links.

The client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple servers on multiple hosts (sometimes called tiers) for reasons that include reliability, scalability, and redundancy, but not limited to those reasons.

Figure 1:
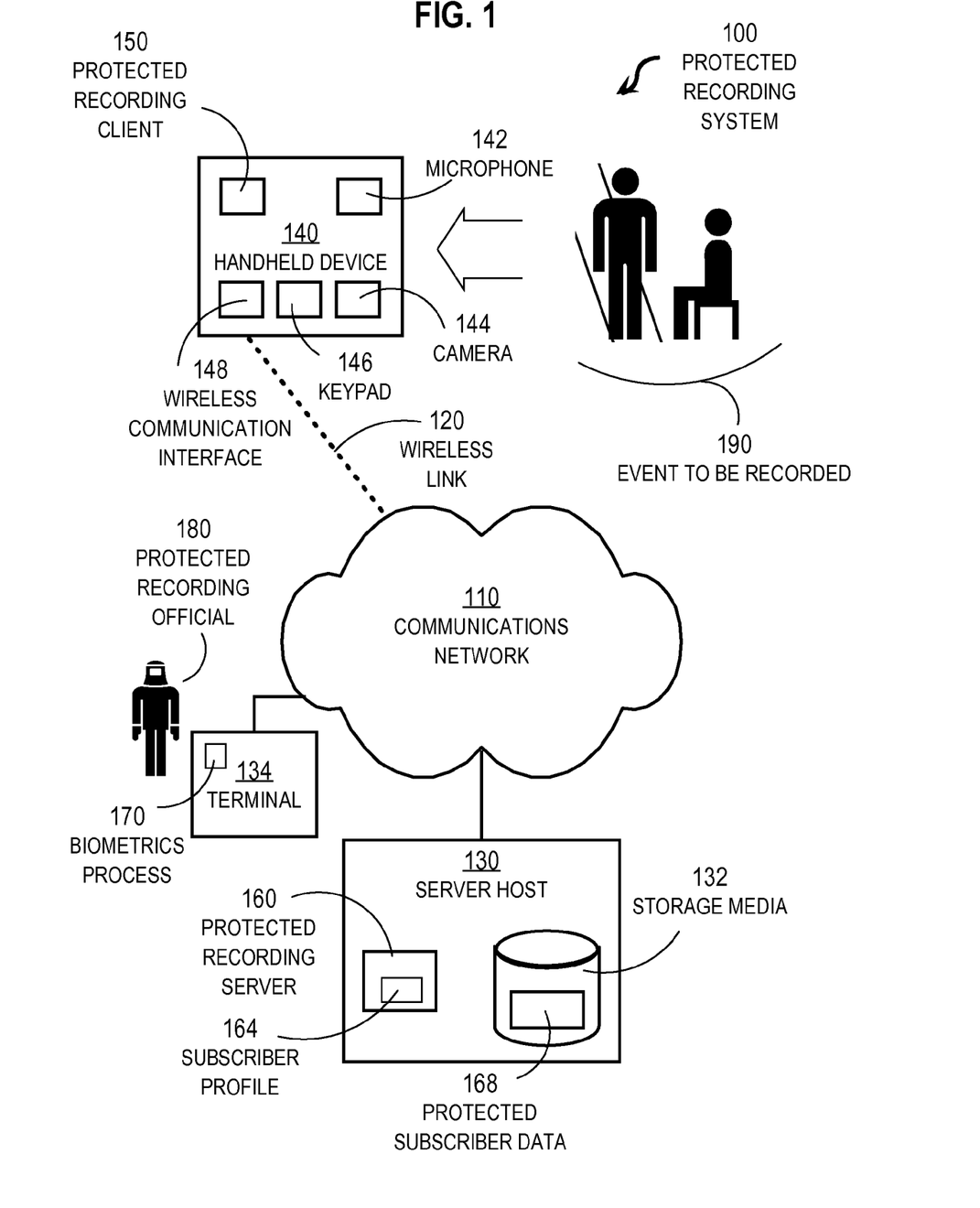
FIG. 1 illustrates an example system for protected recording.

FIG. 1 illustrates an example system 100 for protected recording. The illustrated system 100 includes a communications network 110, a handheld device 140, a server host 130, a terminal 134 and an official 180. In other embodiments, a system includes more, fewer or different devices, hosts, and officials. Also depicted in FIG. 1 is an event to be recorded 190, represented by an interaction between a seated human figure and a standing human figure. Although depicted in FIG. 1, the event to be recorded 190 is not part of system 100.

The communications network 110 includes an access network, or a provider network or an Internet, or some combination. Wireless end nodes are connected to network 110 via wireless links, such as wireless link 120, each indicated by a broken line. In the illustrated embodiment, an access network is a radio access network (RAN) such as a cellular telephone network. Well known access network protocols include the General Packet Radio Service (GPRS) protocol, and the Code Division Multiple Access (CDMA) protocol. These and other protocols used in mobile networks are described in specifications of the 3rd Generation Partnership Project (3GPP) available in the specs directory of the 3gpp.org domain of the World Wide Web and in the specs subdirectory of the Public_html directory of the 3gpp2.org domain. Another well-known access network is the World Interoperability for Microwave Access (WiMAX), based on the Institute of Electrical and Electronics Engineers (IEEE) 802.16 standard. A network access gateway is an intermediate network node through which traffic from an access network connects to the Internet that uses the Internet Protocol (IP). Mobile IP standards are described in Internet Engineering Task force (IETF) Request for Comments (RFC) 3344 and updates in IETF RFC 4721. RFC 3344 is described in file rfc3344.txt and RFC 4721 is described in file rfc4721.txt. These and other RFC files are available in directory rfc at domain ietf.org of the World Wide Web.

In some embodiments, the network access gateway is connected directly to a provider network or Internet, or both. In some embodiments, the network access gateway is connected to the provider network, or Internet, or both, through one or more other intermediate network nodes, such as a node acting as a firewall to divert hostile traffic In other embodiments, an access network is a different type of network, such as a cable access network, or a telephone network used for dial-in service. In some embodiments, the handheld device 140 is connected to communications network 110 via a wire or cable instead of wireless link 120. In some embodiments the handheld device 140 is replaced by a device that is not handheld, such as a desktop computer.

The illustrated handheld device 140 includes a microphone 142 for capturing sound, a camera 144 for capturing still photos or video, a keypad 146, and a wireless communication interface 148. The keypad includes one or more keys that can be pressed by an operator of handheld device 140 to cause one or more processes on the handheld device 140 to begin or cease execution. In other embodiments, other input devices, such as a thumbwheel or motion detector, are included along with or instead of keypad 140 for receiving manual input from an operator of the handheld device 140. In some embodiments, the keypad is omitted and manual input is by voice commands sensed through microphone 142.

The communications interface 148 configures the handheld device 140 as an end node connected to communications network 110 via wireless link 120. In other embodiments, other end nodes include other wireless devices, such as cellular telephones or wireless network access cards in a portable computing device, such as a laptop computer or personal digital assistant (PDA). In some embodiments, the end node is a mobile node that can access the access network at multiple access points (not shown) in network 110. In some embodiments, one or more end nodes is configured as a wired data capture device, such as a wired telephone, or a wired camera, such as a web camera.

Also connected to communications network 110 is a server host 130. Host 130 includes storage media 132 and protected recording server 160. Protected recording server 160 includes a subscriber profile data structure 164 and stores subscriber captured data in protected subscriber data structure 168 on storage media 132.

Also connected to communications network 110 is terminal 134. In the illustrated embodiment, terminal 134 includes biometrics process 170. Also in the illustrated embodiment, the protected recording official 180 communicates with server host 130 using terminal 134. Although terminal 134 is depicted as connected indirectly to server host 130 through communications network 110, in some embodiments terminal 134 is connected directly to server host 130.

According to the illustrated embodiment, the handheld device 140 includes a protected recording client 150; and host 130, different from handheld device 140, includes a protected recording server 160. The protected recording client automatically sends, to protected recording server 160 through wireless communication interface 148, data captured by the handheld device 140 at microphone 142 or camera 144, or both, in near real time. Near-real time is used to refer to timing that is perceived by humans to be instantaneous or nearly so and includes a live feed of captured data. The protected recording server 160 stores the near-real time data sent by client 150 in protected subscriber data structure 168.

The captured data is preserved in the data structure 168 until the subscriber indicates the captured data should be deleted and demonstrates that the subscriber is not under duress. In some embodiments, the subscriber demonstrates that the subscriber is not under duress based on measurements of the subscriber taken by the biometrics process 170 on terminal 134. In some embodiments, the subscriber demonstrates that the subscriber is not under duress based on a private meeting with protected recording official 180, who enters onto terminal 134 data that indicates the subscriber is not under duress. In some embodiments, the subscriber demonstrates that the subscriber is not under duress based on both a private meeting with protected recording official 180 and on measurements of the subscriber taken by the biometrics process 170.

In some embodiments, the captured data in the protected subscriber data structure is forwarded to a third party recipient, or otherwise acted upon, based on disposition data included in subscriber profile data structure 164.

Although storage media 132 is depicted as included in server host 130, in other embodiments the protected subscriber data 168 is stored on one or more storage media 132 distributed over one or more different locations on communications network 110. Similarly, although terminal 134 is depicted as connected to network 110 separately from server host 130, in other embodiments the terminal is connected directly to server host 130. In the illustrated embodiments, the protected recording official 180 accesses the network 110 on the same terminal that has a biometrics process 170. In other embodiments the protected recording official 180 accesses the network 110 on a different terminal from terminal 134 that has biometrics process 170; and one or both or neither is connected to server host 130.

3.0 Method

According to an illustrated embodiment, a service provider provides a protected data capture service to one or more subscribers. In the illustrated embodiment, the service provider guarantees to store indefinitely and securely any data captured and designated protected. The service provider guarantees to store it securely on one or more storage media in such a manner as to be able to accurately reproduce the captured data. In some embodiments, the data is stored to provide assurances that it has not likely been tampered with. In some embodiments, the data is marked with a time stamp that uniquely indicates when the data was captured. The subscriber can only delete the data officiallly if the subscriber can demonstrate that the subscriber is not under duress, for example by presenting himself or herself to the official 180 in private so that the official can make a reasonable determination whether the subscriber is under duress. In some embodiments, a biometrics process measures one or more of the subscriber's biological processes, such as heart rate, temperature, blood pressure or breathing rate to determine whether the subscriber is likely under duress or to identify the subscriber or both.

In some embodiments, the service provider guarantees to deliver the captured data to a third party after some period of time. For example after a designated period of time agreed with the subscriber to be sufficient for the subscriber to report to a facility of the service provider, the service provider presumes that some misfortune, such as imprisonment or death, has befallen the subscriber. The captured data is then forwarded to one or more recipients named by the subscriber to receive the captured data after such a period of time. In some embodiments, receipt of the captured data is verified to ensure delivery to the designated recipient is accomplished. In other embodiments, other actions are performed after the designated period of time.

Thus if the subscriber witnesses an event to be recorded 190, such as a threat issued by the standing person to the seated person, or a verbal agreement reached by the two persons, one of whom may be the subscriber, then the captured data is immediately stored on storage media 132 and can not be deleted by the subscriber, unless the subscriber reasonably demonstrates that there is no duress. Thus none of the persons participating in the event, nor an interested bystander, can as effectively threaten the subscriber to delete the captured data. The subscriber has power to cause the captured data to be released to the detriment of the threatening person, such as to the press or to a supervisor. This power can be leveraged to reduce the incentive for the threatening person to carry out any threat against the subscriber. As a result, both the data and the subscriber are protected to some degree by the data capture service.

In the following subsections, methods to provide protected recording based on the structures depicted in FIG. 1 are described below as processes executing on handheld device 140 or server host 130 or both.

3.1 Method at Protected Recording Client

Figure 2:
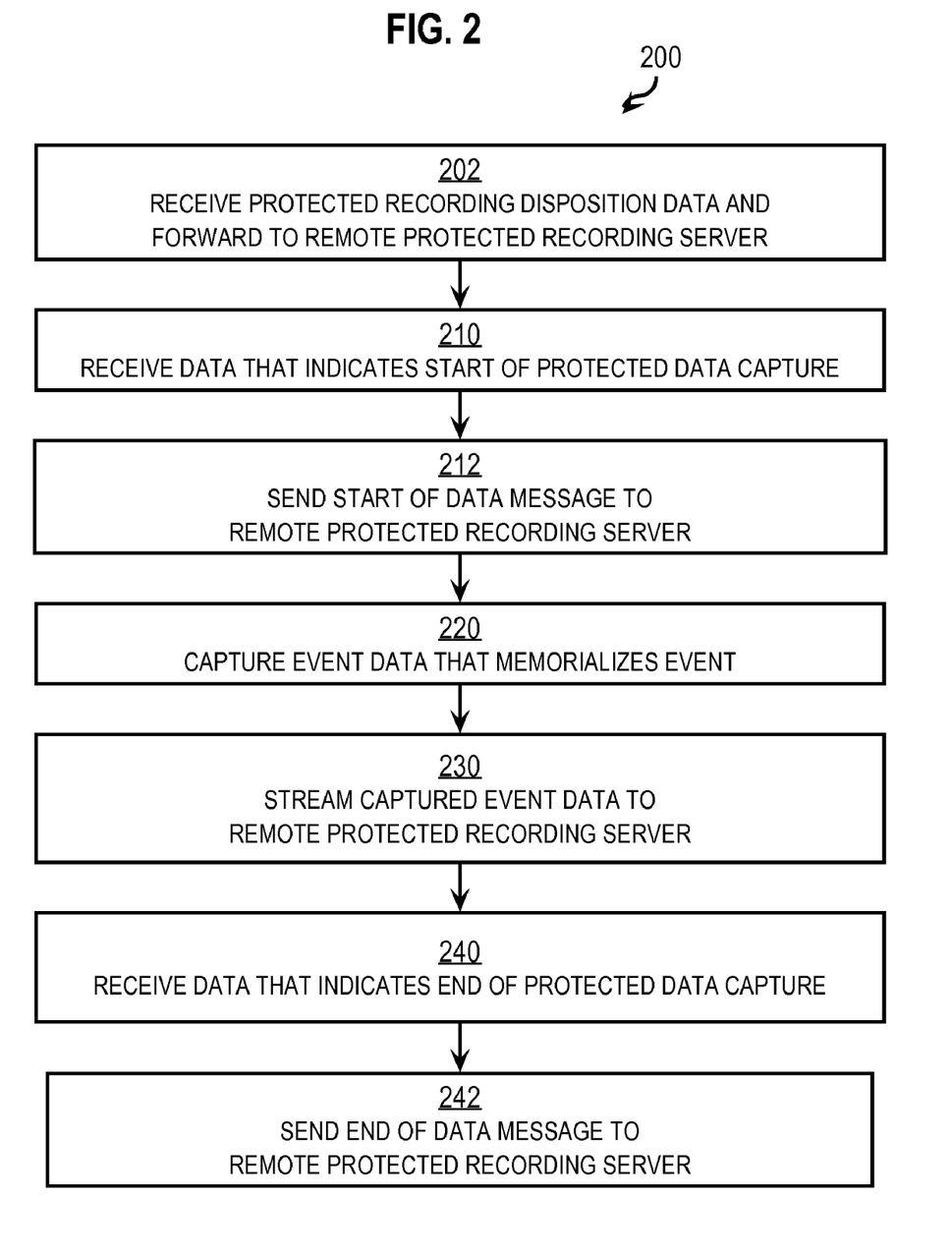
FIG. 2 illustrates an example capture method for a protected recording client.
Figure 3:
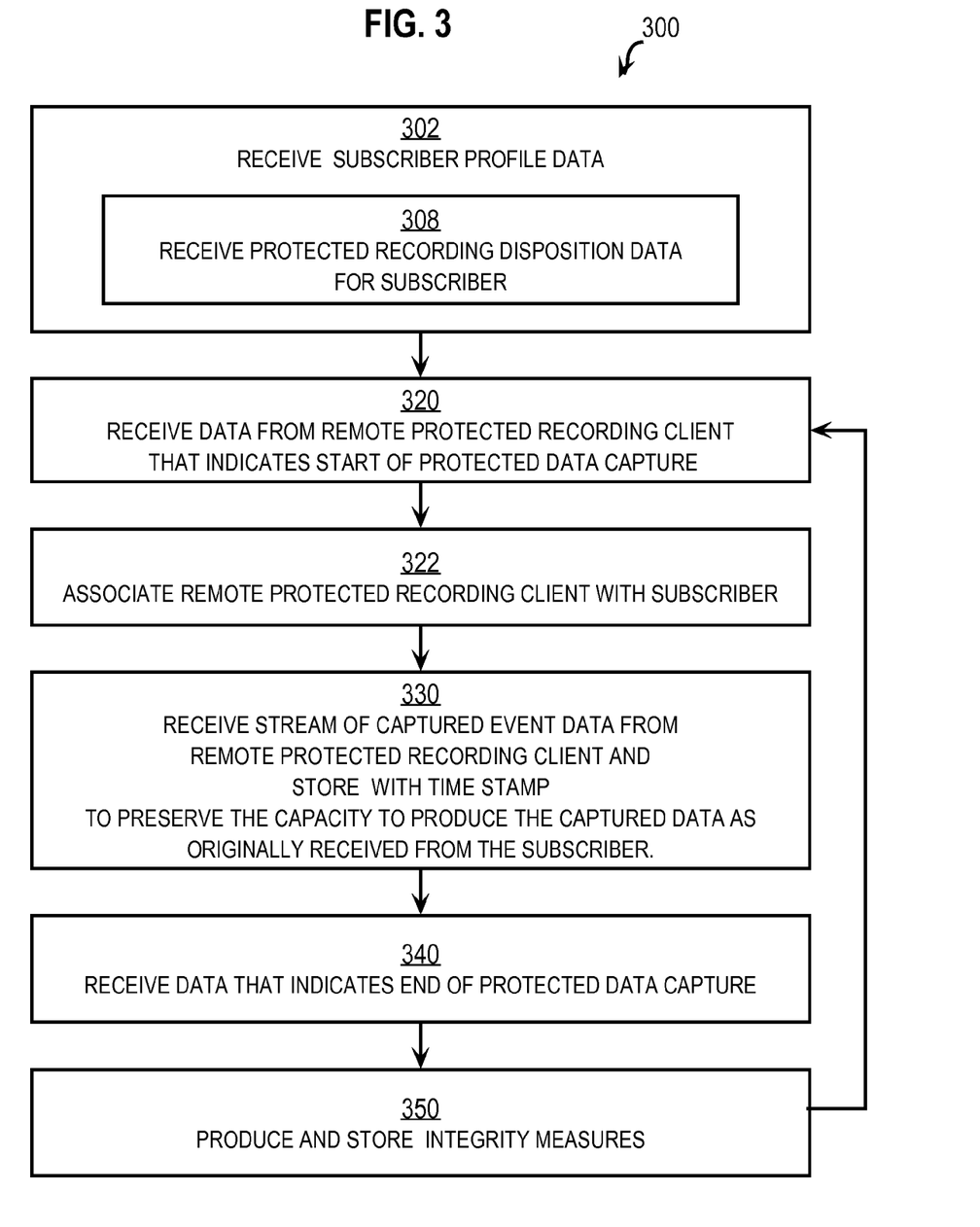
FIG. 3 illustrates an example recording method for a protected recording server.
Figure 4A:
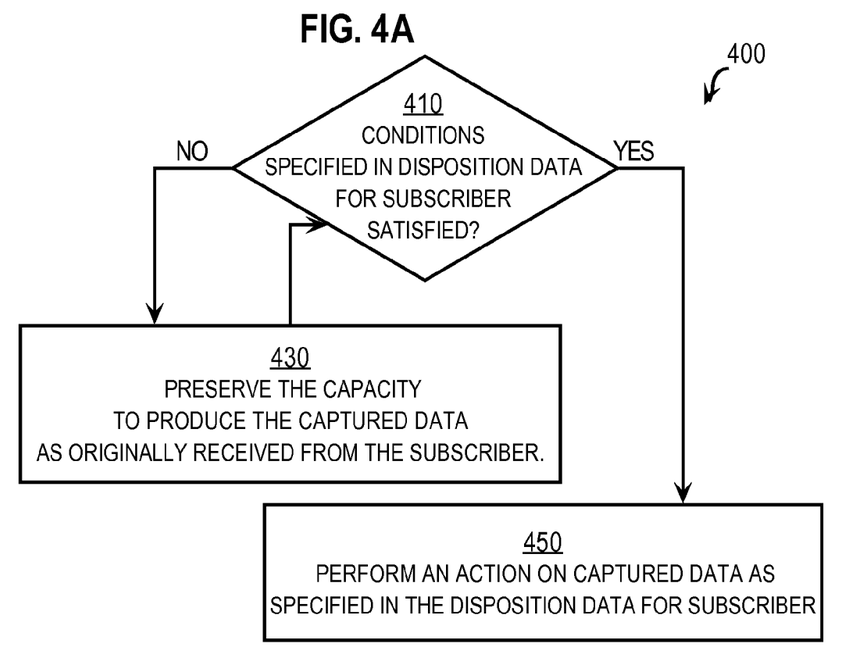
FIG. 4A illustrates an example disposition method for a protected recording server.
Figure 4B:
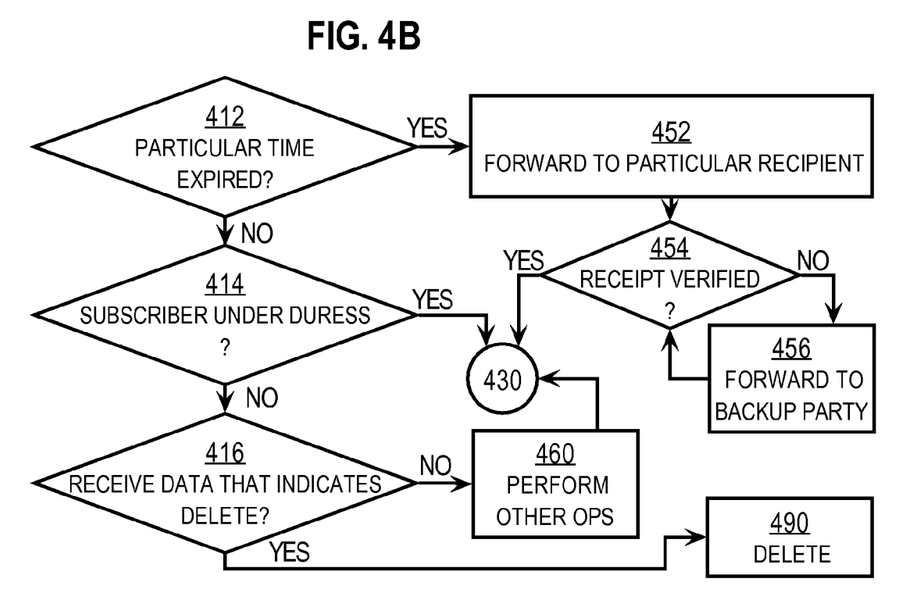
FIG. 4B illustrates a more detailed example disposition method for a protected recording server.

FIG. 2 illustrates an example capture method 200 for a protected recording client. Although steps in FIG. 2 and subsequent flow charts, FIG. 3, FIG. 4A and FIG. 4B, are show in a particular order for purposes of illustration, in other embodiments, one or more steps may be performed in a different order or overlapping in time, in series or in parallel, or one or more steps may be omitted or added, or changed in some combination of ways.

In step 202, protected recording disposition data is received and forwarded to a remote protected recording server, e.g. server 160. Any method may be used to receive this data. For example, in various embodiments, the data is included as a default value in software instructions, is received as prompted or unsolicited manual input from a person on the local or a remote node, is retrieved from a local file or database, or is sent from a different node on the network, either in response to a query or unsolicited, or the data is received using some combination of these methods.

Protected recording disposition data indicates how any data designated protected recording data is to be handled. For example, in various embodiments, the protected recording data is to be stored with a time stamp that uniquely indicates a time of the recording, or with some measure of integrity that indicates the data has not been modified since recording, or both, or neither. An example of an integrity measure is a one way hash function result from inputting the original recording appended with a timestamp. In some embodiments, the disposition data indicates that the protected recording data is to be forwarded to one or more particular recipients at a particular time or after a particular waiting period. In some embodiments, the disposition data indicates that receipt by the one or more particular recipients must be verified. In some embodiments, the disposition data indicates that the protected data is to be forwarded to one or more third parties if receipt by the particular recipient can not be verified after a specified number of one or more tries. In some embodiments, the disposition data indicates that receipt by the one or more third parties must be verified.

In some embodiments, the disposition data indicates that the protected recording data is to be deleted on a certain data or a certain time or upon the satisfaction of certain conditions, such as the passage of an election or the attainment of some financial threshold, such as a stock market index reaching a particular value.

In the illustrated embodiments, the disposition data indicates the protected recording is to be deleted only upon the subscriber issuing a command to delete and demonstrating that the subscriber is not under duress. In some embodiments, the subscriber demonstrates that the subscriber is not under duress by presenting himself or herself in person and in private to an official of the service provider at premises of the service provider. In some embodiments, the subscriber demonstrates that the subscriber is not under duress by submitting to a biometrics sensor of a biometrics process that can uniquely identify a human individual and detect stress in that human individual. In some embodiments, the disposition data indicates that the subscriber must identify himself or herself with certain credentials, such as a government-issued picture ID or some authority-provided digital password.

In some embodiments, the subscriber provides the disposition data separately, not on the handheld device 140 or through the protected recording client 150. For example, in some embodiments, the subscriber enters the disposition data on the protected client server host 130; in some embodiments the subscriber enters the disposition data on a different end node connected to the protected recording server 160 through the communications network 110, such as at terminal 134. In such embodiments, step 202 is omitted in the protected recording client 150.

In some embodiments, default disposition data is used, the subscriber need not specify any disposition data, and step 202 is omitted from protected recording client 150. For purposes of illustration, it is assumed that the default disposition data indicates that the protected recording data is to be kept with a time stamp and measure of integrity and released to multiple organizations of the public press after one week. Deletion is not authorized by anyone other than the subscriber except as required by a court of law after all appeals have been exhausted. Deletion is allowed by the subscriber upon the subscriber issuing a command to delete and demonstrating that the subscriber is not under duress by presenting himself or herself in person and in private to an official of the service provider at premises of the service provider.

In step 210, data is received that indicates a start of data capture for protected recording. Any method may be used to receive this data. In some embodiments, the data is received in response to an operator of handheld device 140 pressing a sequence of one or more keys on keypad 146. In an illustrated embodiment, the keypad 148 includes a special key for protected recording, designated here the PREC key. In some embodiments, to reduce accidental pressing of a single key, the operator strokes a special sequence of two keys to indicate the start of protected recording data capture, such as stroking the PREC key followed by stroking a key distant from the PREC key. In other embodiments, more keys are included in the sequence. It is an advantage for emergency use that the sequence not be too long. A sequence of five or fewer keystrokes is considered preferable to a sequence involving more than five keystrokes.

In step 212, a message is sent to the protected recording server 160 that indicates a start of data to be protected, in response to receiving the data that indicates a start of data capture for protected recording. Any useful information may be included in the start of protected recording data message. For example, the handheld device 140 uses wireless communication interface 148 to set up a media session with the protected recording server 160 using any of several existing or soon to be developed protocols, such as the Session Initiation Protocol (SIP), well known in the art. The protected recording client is configured with any information needed to accomplish this start of data message, including data that indicates how to find the protected recording server 160 on communications network 110.

In some embodiments, the start of data message includes data that indicates the location of the handheld device, such as the nearest cell tower with which the device is communicating, or a Global Positioning System (GPS) position if the handheld device includes GPS equipped.

In step 220, an event is captured as event data that memorializes the event. For example, the microphone 142 captures audio data of a conversation between the figures depicted in the event 190 that memorializes a contract between the two or a threat issued by one against the other. In some embodiments, a camera 144 captures image or video data of a participant that memorializes the actions of that participant, such as a handshake or nod of agreement between two participants in a contract, a crime, or threatening gestures against an operator of the handheld device.

In step 230, the captured data is streamed in near real-time to the remote recording server 160. For example, event data captured by microphone 142 and camera 144 are streamed in near-real time through the wireless communication interface 148 over wireless link 120 through communications network 110 to host 130 and thence to protected recording server 160 via a session negotiated during step 212.

In step 240, data is received that indicates end of the protected data capture. Any method may be used to receive this data. In some embodiments, the data is received in response to an operator of handheld device 140 pressing a sequence of one or more keys on keypad 146. In some embodiments, to reduce accidental pressing of a single key, the operator strokes a special sequence of two keys to indicate the start of protected recording data capture, such as stroking the PREC key again followed by stroking a key distant from the PREC key and different from the key that is used to indicate start of protected data capture. In other embodiments, more keys are included in the sequence. It is again an advantage for emergency use that the sequence not be too long. A sequence of five or fewer keystrokes is considered preferable to a sequence involving more than five keystrokes.

In step 242, a message is sent to the protected recording server 160 that indicates an end of data to be protected, in response to receiving in step 240 the data that indicates an end of data capture for protected recording. Any useful information may be included in the end of protected recording data message. For example, the handheld device 140 uses wireless communication interface 148 to break down a media session with the protected recording server 160 using any of several existing or soon to be developed protocols, such as SIP. In some embodiments, a cessation in the data stream for some period of time, e.g., 30 seconds, is considered by the protected recording server 160 as equivalent to and end of data message.

For example, it is assumed for purposes of illustration that a subscriber in possession of handheld device 140 subscribes to the service with the default disposition data, as indicated to official 180 and communicated to server 160 through terminal 134. The subscriber then encounters an attempted mugging of the seated person by the standing person depicted in the event to be recorded 190. The subscriber presses the PREC key and the prescribed second key, then directs the camera 144 and microphone 142 of the handheld device 140 to captures the event. The subscriber announces to the participants in the event that the subscriber is recording the event in a protected recording. Even if the standing person turns and wrestles the handheld device from the subscriber, and destroys the handheld device, data that can be used to identify the standing person has already been captured and streamed to the protected server. In various embodiments, the data is associated with a particular time or location or both. If it is widely known that such protected recording services are available, then the standing person is aware that he or she cannot destroy the data. Any harm inflicted on the handheld device or the subscriber or the seated person will now likely be blamed on the standing person. The standing person is motivated to leave the scene without further pursing any crimes in the view or vicinity of the subscriber. Thus, both the data and the operator of the handheld are protected, as is the seated person—a member of the public.

3.2 Method at Protected Recording Server

FIG. 3 illustrates an example recording method 300 for a protected recording server, such as server 160. In step 302, the protected recording server receives subscriber profile data. Any method may be used to receive this profile data, as described above for step 202. The subscriber profile data includes any data useful for providing protected recording services for the subscriber, such as a subscriber identifier, subscriber account information, subscriber billing information, and identifiers for equipment and devices with communication links owned or controlled by the subscriber. In the illustrated embodiments, step 302 includes step 308 of receiving the protected recording disposition data for the subscriber, as described above during step 202. In step 308, any subscriber disposition data received on the protected recording client 150 and sent to the server 160 is received at the server 160.

In step 320, data is received from a remote protected recording client, e.g., client 150, which indicates the start of protected data capture. For example, the message sent by the client 150 in step 212 is receive by the server 160 in step 320. In some embodiments, step 320 includes exchanging one or more messages with the client 150 to set up a media session with the protected recording client 150 using any of several existing or soon to be developed protocols, such as SIP.

In some embodiments, the start of data message includes data that indicates the location of the remote host of the client 150. For example, in some embodiments, the start of data message includes data that indicates the nearest cell tower with which the handheld device 140 is communicating, or a GPS position if the handheld device 140 is so equipped.

In step 322 the remote protected recording client is associated with the subscriber. For example, an IP address or other identifier of the handheld device 140, such as mobile subscriber identifier (MSID, which changes less often than IP for mobile devices), is associated with a particular subscriber identifier based on the profile data. Step 322 is performed to distinguish the data stream to be received over the current session from those that might be coming from other subscribers of the service.

In step 330, a stream of captured event data is received from the remote protected recording client, e.g., client 150, and stored with a time stamp in such a way as to preserve the capacity to produce the captured data originally received from the remote client. For example, the event data is stored in protected subscriber data structure 168 on storage media 132. In some embodiments, the data is compressed for efficient storage, e.g., on storage media 132, in such a way that the original data can be reproduced accurately. In some embodiments, the data is stored in temporary fast storage and moved to more persistent storage when the data capture is completed.

In step 340, data is received from a remote protected recording client, e.g., client 150, that indicates the end of protected data capture. For example, the message sent by the client 150 in step 242 is received by the server 160 in step 340. In some embodiments, step 340 includes exchanging one or more messages with the client 150 to break down a media session with the protected recording client 150 using any of several existing or soon to be developed protocols, such as SIP. In some embodiments, step 340 includes detecting a cessation of data packets in the media session with the protected recording client 150.

In step 340, in response to receiving data that indicates end of data capture, the recording is halted. In some embodiments, compression is performed at this step. In some embodiments, the stored data is moved from temporary to persistent storage media during this step.

In step 350, an integrity measure is produced and stored with the data. For example, a timestamp or secret key is concatenated to the data recording and the combined data is input to a one way hash function. The resulting hash value is stored in association with the data. If the data is changed, a hash of the changed data will produce a different result from the stored hash value, thus revealing the change.

Control then passes back to step 320 to receive data that indicates the start of another protected data capture session.

Using the steps of method 300, the data captured by remote protected recording client 150, e.g., on handheld 140, is stored on storage media, e.g., media 132, distant from the event and inured against influence by participants in the event other than a duress-free subscriber.

FIG. 4A illustrates an example disposition method 400 for a protected recording server.

In step 410, it is determined whether one or more conditions predicate, specified in the disposition data for the subscriber, are satisfied. If not, control passes to step 430.

In step 430, the capacity is preserved to produce the captured data as originally received from the subscriber. For example, the compressed data and associated integrity measure are preserved in protected subscriber data 168 on storage media 132. In some embodiments, encrypted copies or other backups of the data are made to preserve the capacity to reproduce the data originally captured as part of step 430. Control then passes back to step 410, such as after an interrupt, to determine if some conditions predicate specified in the disposition data are now satisfied.

If it is determined, in step 410, that one or more conditions predicate, specified in the disposition data for the subscriber, are satisfied, then control passes to step 450. In step 450, an action is performed on the captured data as specified in the disposition data for the subscriber. For example, the data is forwarded to a particular recipient after a particular time, both specified in the disposition data.

In some embodiments, conditions and actions are applied only if specified in the disposition data before the data is captured. This prevents a bad performer from coercing the subscriber to change the rules for deleting the protected data or making the protected data public. While the subscriber is free to change the disposition data, the new conditions and actions are only applied to protected data captured after the changes to the disposition data.

FIG. 4B illustrates a more detailed example disposition method for a protected recording server. In FIG. 4B, step 412, step 414 and step 416 are included in a particular embodiment of step 410. Step 410 also encompasses other embodiments. In FIG. 4B, step 452, step 454, step 456, step 460 and step 490 are included in a particular embodiment of step 450. Step 450 also encompasses other embodiments.

In step 412 it is determined if a particular time has just expired since the protected data has been stored. If so, control passes to step 452.

In step 452, the protected data is forwarded to one or more particular recipients specified in the disposition data. Any method may be used, such as email, file transfer, data streaming, or printing and sending a DVD through regular post, among others. The particular recipients are either default recipients, such as multiple members of the public press, or recipients specified in the disposition data, such as a lawyer for the subscriber. Control then passes to step 454.

In step 454, it is determined whether receipt by one or more of the recipients has been verified. For example, an acknowledgement email for an email sent is received; or a postal reply to a DVD sent by post is received within a specified time frame. If receipt is not verified, control passes to step 456. In some embodiments, if receipt is not verified, control is passed back to step 452 for one or more additional attempts to forward the protected data; and control passes to step 456 only after a specified number of additional steps have been attempted and receipt still can not be verified.

In step 456, the protected data is forwarded to one or more backup parties. Control then passes back to step 454 to determine whether receipt by one or more of the backup parties has been verified. If receipt is not verified, control passes back to step 456.

If it is determined, in step 454, that receipt by one or more of the recipients (or backup parties) has been verified, then control passes to step 430 described above to preserve the capacity to produce the original protected data.

If it is determined, in step 412, that the particular time has not just expired since the protected data has been stored (or the particular time has expired and the data has been forwarded), then control passes to step 414. In step 414, it is determined whether the subscriber is under duress. If so, control passes to step 430, described above to preserve the capacity to produce the captured data. In some embodiments, control passes first to step 452, to forward the protected data to the particular recipient, if the subscriber is under duress.

As described above, any method may be used to determine whether the subscriber is under duress. The subscriber is presumed not under duress if he or she can walk calmly and alone into an office or other private space in the presence of an official of the service provider and show no signs of duress and express no statements indicating duress. If the subscriber is not personally known to the official, the official should obtain some credentials from the subscriber, such as a government-issued photographic identifier (ID). The subscriber is also presumed not under duress if the subscriber can show some credentials to a computer process and pass a biometrics test designed to detect stress.

If it is determined, in step 414, that the subscriber is not under duress, then control passes to step 416. In step 416, it is determined whether command data is received that indicates the subscriber wishes to delete any protected recording data that belongs to the subscriber. If so, control passes to step 490 to delete the protected recording data indicated in the command data.

If it is determined, in step 416, that command data is received that does not indicates the subscriber wishes to delete any protected recording data that belongs to the subscriber, then control passes to step 460. In step 460, the server, e.g., server 160, performs on the protected data indicated in the command data the action specified in the command data. For example, a copy of the protected is data with the time stamp and a certification of authenticity is made by the service provider for display to others outside the system, such as a judge enforcing a contract. Control then passes to step 430, described above, to preserve the capacity to produce the captured data.

4.0 Implementation Mechanisms—Hardware Overview

Figure 5:
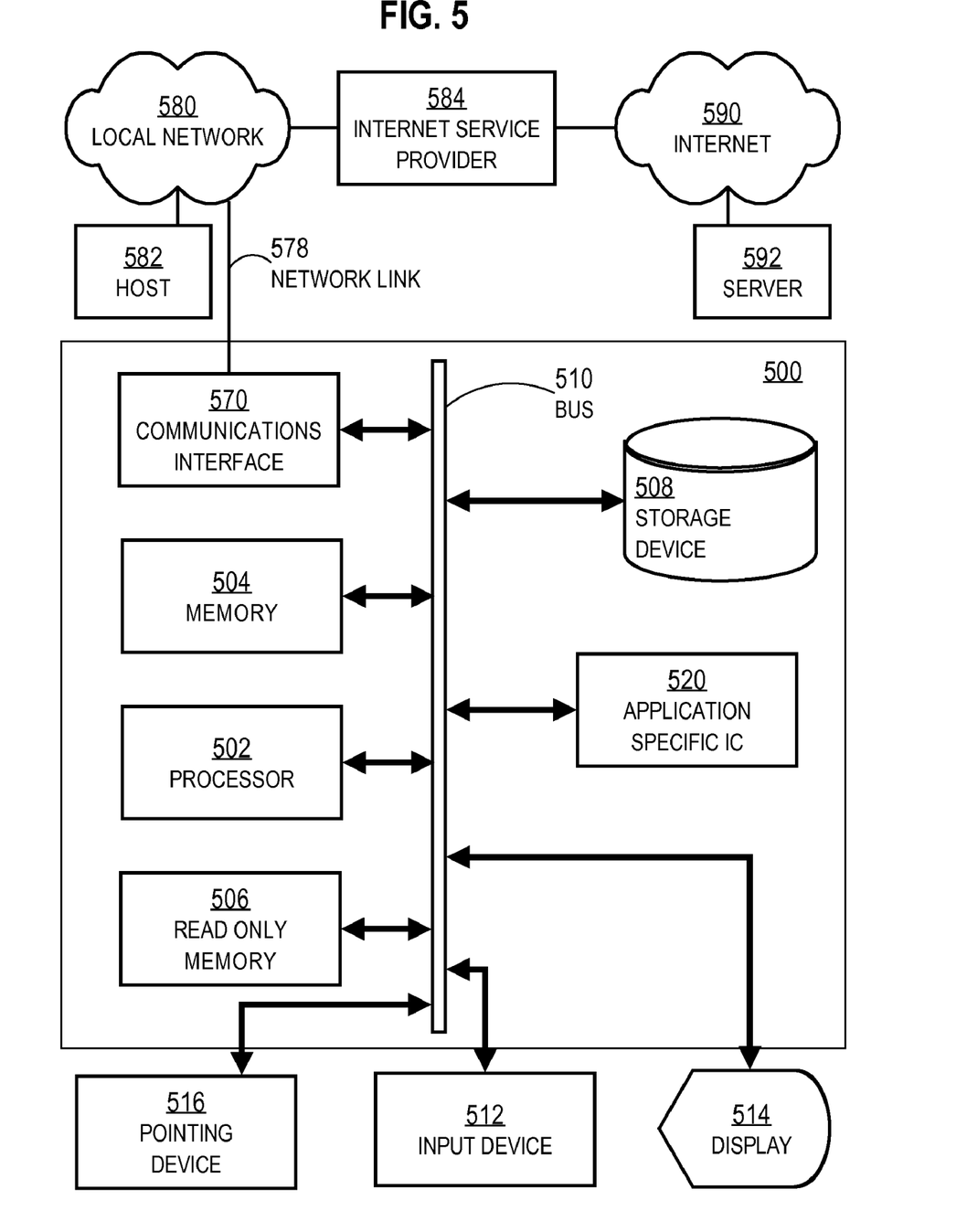
FIG. 5 illustrates a computer system upon which an embodiment of the invention may be implemented.

FIG. 5 illustrates a computer system 500 upon which an embodiment of the invention may be implemented. Computer system 500 includes a communication mechanism such as a bus 510 for passing information between other internal and external components of the computer system 500. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 510 includes many parallel conductors of information so that information is transferred quickly among devices coupled to the bus 510. One or more processors 502 for processing information are coupled with the bus 510. A processor 502 performs a set of operations on information. The set of operations include bringing information in from the bus 510 and placing information on the bus 510. The set of operations also typically include comparing two or more units of information, shifting positions of units of information, and combining two or more units of information, such as by addition or multiplication. A sequence of operations to be executed by the processor 502 constitute computer instructions.

Computer system 500 also includes a memory 504 coupled to bus 510. The memory 504, such as a random access memory (RAM) or other dynamic storage device, stores information including computer instructions. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of computer instructions. The computer system 500 also includes a read only memory (ROM) 506 or other static storage device coupled to the bus 510 for storing static information, including instructions, that is not changed by the computer system 500. Also coupled to bus 510 is a non-volatile (persistent) storage device 508, such as a magnetic disk or optical disk, for storing information, including instructions, that persists even when the computer system 500 is turned off or otherwise loses power.

Information, including instructions, is provided to the bus 510 for use by the processor from an external input device 512, such as a keyboard containing alphanumeric keys operated by a human user, or a sensor. A sensor detects conditions in its vicinity and transforms those detections into signals compatible with the signals used to represent information in computer system 500. Other external devices coupled to bus 510, used primarily for interacting with humans, include a display device 514, such as a cathode ray tube (CRT) or a liquid crystal display (LCD), for presenting images, and a pointing device 516, such as a mouse or a trackball or cursor direction keys, for controlling a position of a small cursor image presented on the display 514 and issuing commands associated with graphical elements presented on the display 514.

In the illustrated embodiment, special purpose hardware, such as an application specific integrated circuit (IC) 520, is coupled to bus 510. The special purpose hardware is configured to perform operations not performed by processor 502 quickly enough for special purposes. Examples of application specific ICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware. Logic encoded in one or more tangible media includes one or both of computer instructions and special purpose hardware Computer system 500 also includes one or more instances of a communications interface 570 coupled to bus 510. Communication interface 570 provides a two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends and receives electrical, acoustic or electromagnetic signals, including infrared and optical signals, that carry information streams, such as digital data. Signals include man-made variations in amplitude, frequency, phase, polarization or other physical properties of carrier waves The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and carrier waves that travel through space without wires or cables, such as acoustic waves and electromagnetic waves, including radio, optical and infrared waves.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Network link 578 typically provides information communication through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590. A computer called a server 592 connected to the Internet provides a service in response to information received over the Internet. For example, server 592 provides information representing video data for presentation at display 514.

The invention is related to the use of computer system 500 for implementing the techniques described herein. According to one embodiment of the invention, those techniques are performed by computer system 500 in response to processor 502 executing one or more sequences of one or more instructions contained in memory 504. Such instructions, also called software and program code, may be read into memory 504 from another computer-readable medium such as storage device 508. Execution of the sequences of instructions contained in memory 504 causes processor 502 to perform the method steps described herein. In alternative embodiments, hardware, such as application specific integrated circuit 520, may be used in place of or in combination with software to implement the invention. Thus, embodiments of the invention are not limited to any specific combination of hardware and software.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server 592 transmits program code for a particular application, requested by a message sent from computer 500, through Internet 590, ISP equipment 584, local network 580 and communications interface 570. The received code may be executed by processor 502 as it is received, or may be stored in storage device 508 or other non-volatile storage for later execution, or both. In this manner, computer system 500 may obtain application program code in the form of a signal on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
receiving, from a subscriber device, disposition data that identifies at least one condition for performing a first action on data associated with the subscriber device and archived by a service provider;
receiving first data associated with the subscriber device at a service provider device;
determining whether the at least one condition is satisfied; and
responsive to the at least one condition issuing a command to delete the first data, wherein the at least one condition includes a biometric analysis showing a subscriber is not under duress.

2. The method as recited in claim 1, wherein if it is determined that the condition is not satisfied, then performing a different second action, wherein performing the second action further comprises preserving the first data as originally received.

3. The method as recited in claim 1, wherein the first data further comprises data that memorializes an agreement between the subscriber and a third party.

4. The method as recited in claim 1, wherein receiving the first data further comprises receiving the first data that memorializes bad behavior by a third party.

5. The method as recited in claim 1, wherein receiving the first data further comprises receiving a live feed of at least one of voice data or video data from the subscriber device.

6. The method as recited in claim 5, wherein the subscriber device is configured to communicate the live feed via a wireless communication network.

7. The method as recited in claim 2, wherein preserving the first data as originally received further comprises including timestamp data that indicates a time when the first data is received by the service provider.

8. The method as recited in claim 2, wherein preserving the first data as originally received further comprises including integrity data that indicates the first data has not been modified since the first data is received by the service provider.

9. The method as recited in claim 1, wherein the at least one condition includes the subscriber appearing in person at a facility of the service provider.

10. The method as recited in claim 1, further comprising, if it is determined that the condition is satisfied, then performing the first action on the first data.

11. The method as recited in claim 1, wherein performing the first action on the first data further comprises:
responsive to the at least one condition, waiting a predetermined time interval after receiving the first data and forwarding the first data to an identified recipient;
determining whether the recipient receives the first data; and if it is determined that the recipient does not receive the first data, then forwarding the first data to the recipient again.

12. The method as recited in claim 1, wherein:
receiving the disposition data further comprises receiving data that indicates the first action further includes backup forwarding to a backup party;
wherein performing the first action on the first data further comprises determining whether a recipient receives the first data; and
if it is determined that the recipient does not receive the first data, then forwarding the first data to the backup party.

13. A method comprising:
receiving, on a portable apparatus, first data to be recorded;
receiving, on the portable apparatus, second data that indicates the first data is to be recorded securely and associated with a user; and
in response to receiving the second data, transmitting the first data to a remote site, wherein the remote site is configured to store the first data until an indication is received that the user is not under duress and that the first data is to be deleted,
wherein the indication corresponds to a biometric analysis showing the user is not under duress.

14. The method as recited in claim 13, wherein receiving second data further comprises detecting a sequence of keystrokes.

15. The method as recited in claim 14, wherein detecting the sequence of keystrokes comprises detecting fewer than five keystrokes.

16. An apparatus comprising:
means for receiving first data to be recorded;
means for receiving second data that indicates the first data is to be recorded securely for a user of the apparatus; and
means for transmitting the first data to a remote site in response to receiving the second data, wherein the remote site is configured to store the first data until receiving an indication that the user of the apparatus is not under duress indicating that the first data is to be deleted,
wherein the indication includes a biometric analysis showing the user is not under duress.

17. An apparatus comprising:
a network interface that is configured for communicating a data packet with a packet-switched network; and
logic encoded in one or more non-transitory media for execution and, when executed, configured for:
receiving, from a subscriber device, disposition data that indicates at least one condition for performing a first action on data associated with the subscriber device and archived by a service provider;
after receiving the disposition data, receiving, through the network interface, first data associated with the subscriber device; and
determining the at least one condition is satisfied responsive to the at least one condition comprising a biometric analysis showing a subscriber is not under duress and wherein the first action is executing a command to delete the first data.

18. An apparatus comprising:
a network interface that is configured for communicating a data packet with a packet-switched network;
a sensor for capturing data to be recorded; and
logic encoded in one or more non-transitory media for execution and, when executed, configured for:
receiving from the sensor, first data to be recorded;
receiving second data that indicates the first data is to be recorded securely for a user;
in response to receiving the second data, transmitting the first data through the network interface to a remote site, wherein the remote site is configured to store the first data; and
responsive to a biometric analysis showing the user is not under duress, receiving instructions indicating that the first data is to be deleted.

19. Software encoded in one or more non-transitory computer-readable media and, when executed, configured for:
receiving disposition data that indicates at least one condition for performing a first action on data associated with a subscriber device and archived by a service provider;
after receiving the disposition data, receiving first data associated with the subscriber device in near-real time;
determining whether the at least one condition is satisfied;
if it is determined that the condition is not satisfied, then performing a different second action; and
responsive to the at least one condition, waiting a predetermined time interval after receiving the first data and forwarding the first data to an identified recipient, wherein the at least one condition is a biometric analysis showing a subscriber is not under duress and wherein the first action is executing a command to delete the first data.

20. Software encoded in one or more non-transitory computer-readable media and, when executed, configured for:
receiving first data to be recorded;
receiving second data that indicates the first data is to be recorded securely for a user;
in response to receiving the second data, transmitting the first data to a remote site, wherein the remote site is configured to store the first data; and
responsive to a biometric analysis showing the user is not under duress, deleting the first data.

* * * * *

UNITED STATES PATENT AND TRADEMARK OFFICE
CERTIFICATE OF CORRECTION

| | | |
|---|---|---|
| PATENT NO. | : 8,145,184 B2 | Page 1 of 1 |
| APPLICATION NO. | : 11/831918 | |
| DATED | : March 27, 2012 | |
| INVENTOR(S) | : Robert Mackie | |

It is certified that error appears in the above-identified patent and that said Letters Patent is hereby corrected as shown below:

In the Claims:

Column 15, Line 31, in claim 14, after "receiving", insert --the--.

Signed and Sealed this
Seventeenth Day of July, 2012

David J. Kappos
*Director of the United States Patent and Trademark Office*